United States Patent
Kwon et al.

(10) Patent No.: US 9,672,946 B2
(45) Date of Patent: Jun. 6, 2017

(54) WATER SUPPLY TANK USING COMPRESSOR STEAM TO PROVIDE COOLING WATER TO A NUCLEAR REACTOR, AND STRUCTURE INSIDE THE TANK REDUCING INTERNAL COOLING WATER CIRCULATION RESULTING FROM INJECTION OF THE STEAM INTO THE TANK

(71) Applicant: KOREA ATOMIC ENERGY RESEARCH INSTITUTE, Daejeon (KR)

(72) Inventors: Tae-Soon Kwon, Daejeon (KR); Kihwan Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 311 days.

(21) Appl. No.: 14/451,692

(22) Filed: Aug. 5, 2014

(65) Prior Publication Data
US 2015/0243384 A1      Aug. 27, 2015

(30) Foreign Application Priority Data
Feb. 27, 2014   (KR) .................. 10-2014-0023521

(51) Int. Cl.
*G21C 15/18*      (2006.01)
*G21C 15/26*      (2006.01)

(52) U.S. Cl.
CPC ............. *G21C 15/18* (2013.01); *G21C 15/26* (2013.01); *Y02E 30/40* (2013.01)

(58) Field of Classification Search
CPC .................................. G21C 15/18; G21C 15/26
USPC ............................................................ 376/282
See application file for complete search history.

(56) References Cited

U.S. PATENT DOCUMENTS

| | | | | |
|---|---|---|---|---|
| 3,114,414 A | * | 12/1963 | Judd ................. | G21D 5/08 376/307 |
| 3,164,174 A | * | 1/1965 | Berthod ............ | G21C 1/09 376/283 |
| 3,212,565 A | * | 10/1965 | Esleeck ............ | G21C 1/09 376/307 |

(Continued)

FOREIGN PATENT DOCUMENTS

KR        101071415 B1      10/2011

OTHER PUBLICATIONS

Jinzhao Zhang et al.; Nuclear Engineering and Design; 1998, vol. 186; pp. 279-301.

(Continued)

*Primary Examiner* — Jack W Keith
*Assistant Examiner* — Daniel Wasil
(74) *Attorney, Agent, or Firm* — Maier & Maier, PLLC

(57) ABSTRACT

A passive high-pressure safety injection system includes a compressor which generates high-temperature and high-pressure steam, a cooling water supply tank which supplies cooling water using the compressed steam, a nuclear reactor which receives the cooling water so that the nuclear reactor is maintained in a cooled state, and an internal circulation prevention structure which is provided in the cooling water supply tank and prevents the cooling water from circulating in the cooling water supply tank.

12 Claims, 9 Drawing Sheets

(56) References Cited

U.S. PATENT DOCUMENTS

| | | | | |
|---|---|---|---|---|
| 3,894,391 | A | * | 7/1975 | Heitmann ............ G21C 19/307 |
| | | | | 376/315 |
| 4,000,617 | A | * | 1/1977 | Fortescue ................ G21D 5/06 |
| | | | | 376/322 |
| 5,268,943 | A | | 12/1993 | Corletti et al. |
| 5,943,384 | A | * | 8/1999 | Mansani ................ G21C 9/004 |
| | | | | 376/282 |
| 2008/0285701 | A1 | * | 11/2008 | Meseth .................. G21C 9/033 |
| | | | | 376/282 |
| 2014/0093025 | A1 | * | 4/2014 | Mekiska .............. G21C 15/182 |
| | | | | 376/282 |

OTHER PUBLICATIONS

Sang Il Lee et al.; Assessment of RELAP5/MOD3.1 for Gravity-Driven Injection Experiment in the Core Makeup Tank of the CARR Passive Reactor (CP-1300); NUREG/IA-0134; 1996.

* cited by examiner (A) AP600 type     (B) CARR type

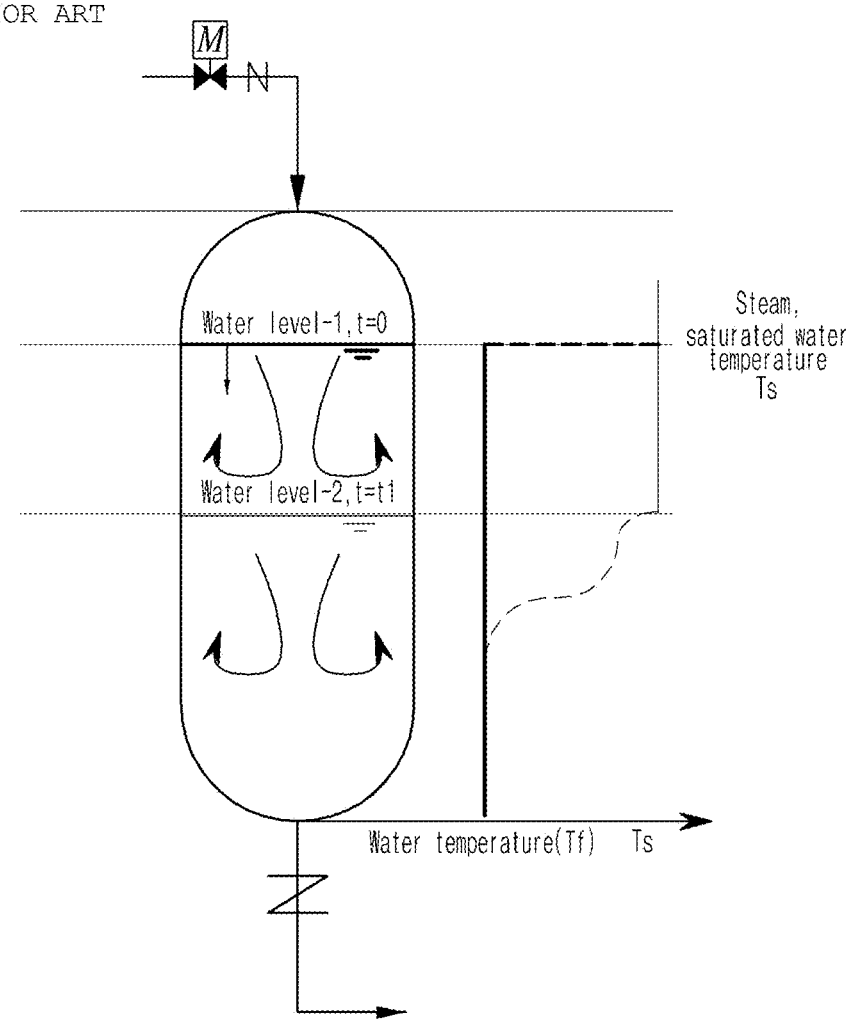

Cross-sectional shapes of heat mixing prevention device taken along ine 'A -'A'

WATER SUPPLY TANK USING COMPRESSOR STEAM TO PROVIDE COOLING WATER TO A NUCLEAR REACTOR, AND STRUCTURE INSIDE THE TANK REDUCING INTERNAL COOLING WATER CIRCULATION RESULTING FROM INJECTION OF THE STEAM INTO THE TANK

CROSS-REFERENCES TO RELATED APPLICATION

This patent application claims the benefit of priority under 35 U.S.C. §119 from Korean Patent Application No. 10-2014-0023521 filed Feb. 27, 2014, the contents of which are incorporated herein by reference.

BACKGROUND OF THE INVENTION

1. Field of the Invention

The present invention relates generally to cooling water supply tanks having heat mixing prevention functions and passive high-pressure safety injection systems and methods using the cooling water supply tanks and, more particularly, to a cooling water supply tank having a heat mixing prevention function which can prevent internal cooling water circulation and heat mixing, which is caused by high-temperature and high-pressure steam injected into a core makeup tank and a hybrid safety injection tank when the core makeup tank and the hybrid safety injection tank are operated, thus restricting an increase in temperature from a free surface of makeup water to a lower portion in the tank, and maintaining a large density difference, whereby injection of cooling water into a nuclear reactor can be facilitated, and to a passive high-pressure safety injection system and method using the cooling water supply tank.

2. Description of the Related Art

As examples of conventional techniques pertaining to safety injection tank systems of emergency core cooling systems of nuclear reactors, AP600 type core makeup tanks (CMTs) were introduced in U.S. Pat. No. 5,268,943 shown in FIG. 1 and "Nuclear Engineering and Design" Vol. 186, p 279 to p 301, and a CARR (CP1300) type core makeup tank was introduced in NUREG-IA-0134.

In addition, as shown in FIG. 2, a hybrid safety injection tank (hybrid SIT) which can be operated both at a low pressure and at a high pressure was proposed in Korean Patent Registration No. 10-1071415 (Reg. date: Sep. 30, 2011), entitled "Passive high-pressure safety injection tank for SOB and LOCA". This technique has a combined structure of a conventional low-pressure SIT (safety injection tank) and a conventional high-pressure CMT (core makeup tank). A pressure equalizing pipe is provided to equalize the pressure between the low-pressure SIT and a high-pressure compressor, and a motor drive valve or a pneumatic drive valve is provided on the pressure equalizing pipe and is used as needed.

Meanwhile, in the conventional technique, when high-temperature and high-pressure steam is injected into the core makeup tank or the hybrid safety injection tank, emergency core cooling water circulates in the core makeup tank or the hybrid safety injection tank. Thereby, the entirety of the emergency core cooling water is rapidly heated. Therefore, at an early stage, density between the core makeup tank or the hybrid safety injection tank and a nuclear reactor connected thereto becomes the same. As a result, it becomes impossible for the emergency core cooling water to be injected into the nuclear reactor by natural circulation. In other words, the drive force by which the emergency core cooling water is injected into the nuclear reactor is markedly reduced.

FIGS. 3A and 3B illustrate a problem of emergency core cooling water being heated early by internal circulation in the core makeup tank or the hybrid safety injection tank according to the conventional technique.

FIG. 3A shows vertical distribution of the temperature of cooling water in the core makeup tank or the hybrid safety injection tank when there is no circulation in the core makeup tank or the hybrid safety injection tank. If there is no internal circulation, only a free surface portion on which high-temperature steam makes contact with makeup water is heated by the high-temperature steam. Therefore, the temperature of the entire cooling water is merely slightly increased.

FIG. 3B shows vertical distribution of the temperature of cooling water in the core makeup tank or the hybrid safety injection tank when there is circulation in the core makeup tank or the hybrid safety injection tank. If there is internal circulation, not only the free surface portion on which high-temperature steam makes contact with makeup water but also the internal portion of the makeup water is heated by the internal circulation. Thereby, the temperature of the cooling water in the core makeup tank or the hybrid safety injection tank is relatively largely increased. As such, if the temperature of the internal portion of the cooling water is increased, a density difference ($\rho_{CMT}-\rho_S$) between the density ($\rho_{CMT}$) of the makeup water and the density ($\rho_S$) of the cooling water of the nuclear reactor is reduced. As a result, drive force by which cooling water is injection into the nuclear reactor is reduced.

SUMMARY OF THE INVENTION

Accordingly, the present invention has been made keeping in mind the above problems occurring in the prior art, and an object of the present invention is to provide a water supply tank having a heat mixing prevention function which can prevent heat mixing from being caused by internal circulation of a cooling water supply tank when high-temperature and high-pressure steam is injected into a core makeup tank or a hybrid safety injection tank, and a passive high-pressure safety injection system and method using the water supply tank.

In order to accomplish the above object, in an aspect, the present invention provides a cooling water supply tank having a heat mixing prevention function, the cooling water supply tank supplying cooling water using steam compressed by a compressor, and comprising an internal circulation prevention structure for preventing the cooling water from circulating in the cooling water supply tank.

The internal circulation prevention structure may include at least one cooling water guide preventing the cooling water from moving in the cooling water supply tank, the cooling water guide partitioning at least a portion of an internal space of the cooling water supply tank into a plurality of areas. The cooling water guide may include at least one vertical partition. The height of the cooling water guide may be greater than the level of cooling water in the cooling water supply tank when the cooling water supply tank is in a standby state before being operated. The cooling water guide may contain non-corrosive metal.

The cross-section of the internal circulation prevention structure may have a shape selected from among a shape having a plurality of polygons, a circular shape and a spiral shape.

In another aspect, the present invention provides a passive high-pressure safety injection system having a heat mixing prevention function, including: a compressor supplying high-temperature and high-pressure steam; a cooling water supply tank supplying cooling water using the high-temperature and high-pressure steam supplied from the compressor; a nuclear reactor receiving the cooling water so that the nuclear reactor is maintained in a cooled state; and an internal circulation prevention structure provided in the cooling water supply tank, the internal circulation prevention structure preventing the cooling water from circulating in the cooling water supply tank.

The cooling water supply tank may include a core makeup tank or a hybrid safety injection tank.

The internal circulation prevention structure may include at least one cooling water guide preventing the cooling water from moving in the cooling water supply tank, the cooling water guide partitioning at least a portion of an internal space of the cooling water supply tank into a plurality of areas. The cooling water guide may include at least one vertical partition. The height of the cooling water guide is greater than the level of cooling water in the cooling water supply tank when the cooling water supply tank is in a standby state before being operated. The cooling water guide may contain non-corrosive metal.

The cross-section of the internal circulation prevention structure may have a shape selected from among a shape having a plurality of polygons, a circular shape and a spiral shape.

The passive high-pressure safety injection system may further include a pressure equalizing pipe provided between the compressor and the cooling water supply tank, the pressure equalizing pipe maintaining a pressure between the compressor and the cooling water supply tank in an equilibrium state. Preferably, the pressure equalizing pipe may include a pressure equalizing control valve provided to maintain the pressure between the compressor and the cooling water supply tank in the equilibrium state.

The pressure equalizing control valve may be operated by emergency power using a battery even during a power station black out accident.

In a further aspect, the present invention provides a passive high-pressure safety injection method with a heat mixing prevention function, including: supplying high-temperature and high-pressure steam compressed by a compressor to a cooling water supply tank; preventing cooling water from circulating in the cooling water supply tank using an internal circulation prevention structure provided in the cooling water supply tank; supplying the cooling water, prevented from circulating in the cooling water supply tank, to the nuclear reactor; and maintaining the nuclear reactor in a cooled state using the cooling water supplied to the nuclear reactor.

Supplying the high-temperature and high-pressure steam compressed by the compressor to the cooling water supply tank may include opening a pressure equalizing control valve provided between the compressor and the cooling water supply tank. The pressure equalizing control valve may be operated by emergency power using a battery even during a power station black out accident.

In using the internal circulation prevention structure provided in the cooling water supply tank to prevent cooling water from circulating in the cooling water supply tank, at least one cooling water guide may be provided in the cooling water supply tank to prevent the cooling water from moving in the cooling water supply tank, wherein the cooling water moves through the cooling water guide so that the high-temperature and high-pressure steam supplied from the compressor is prevented from being mixed with the cooling water.

BRIEF DESCRIPTION OF THE DRAWINGS

The above and other objects, features and advantages of the present invention will be more clearly understood from the following detailed description taken in conjunction with the accompanying drawings, in which:

FIGS. 3A and 3B are views showing variation in temperature of cooling water depending on circulation of the cooling water in the core makeup tank or the hybrid safety injection tank according to a conventional technique;

DESCRIPTION OF THE PREFERRED EMBODIMENTS

Figure 1:
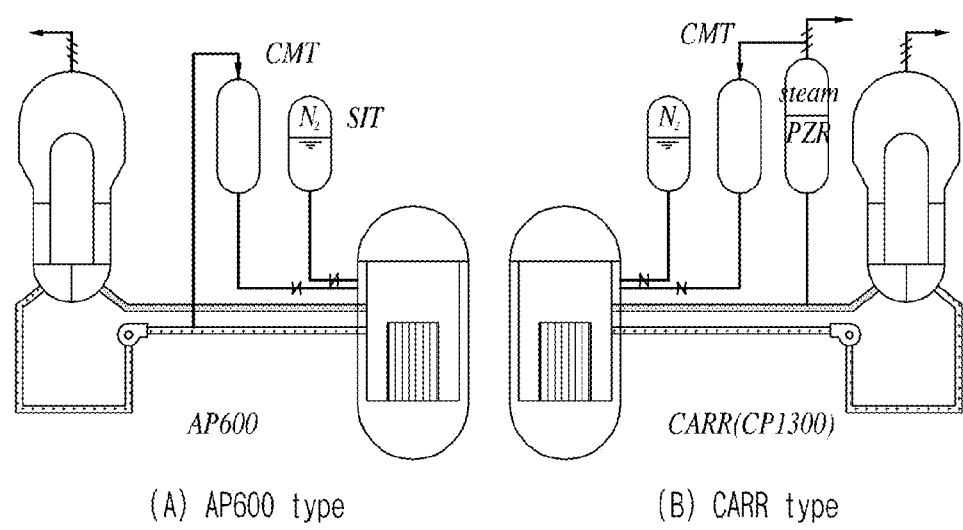
FIG. 1 is a view showing a core makeup tank according to a conventional technique.

Hereinafter, preferred embodiments of the present invention will be described in detail with reference to the attached drawings.

Reference now should be made to the drawings, in which the same reference numerals are used throughout the different drawings to designate the same or similar components. If in the specification, detailed descriptions of well-known functions or configurations would unnecessarily obfuscate the gist of the present invention, the detailed descriptions will be omitted.

Figure 4:
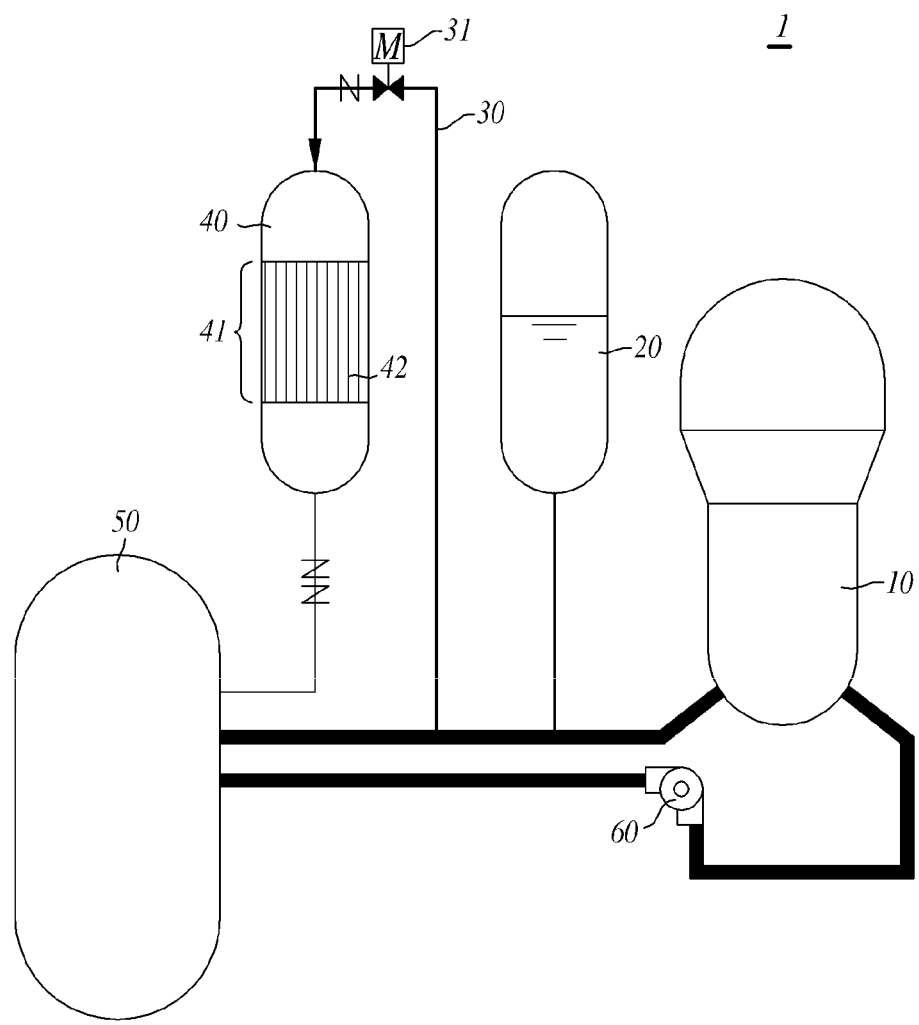
FIG. 4 is a sectional view illustrating a passive high-pressure safety injection system according to an embodiment of the present invention.

FIG. 4 is a sectional view illustrating a passive high-pressure safety injection system according to an embodiment of the present invention.

Referring to FIG. 4, the passive high-pressure safety injection system 1 includes a steam generator 10, a compressor 20, a pressure equalizing pipe 30, a cooling water supply tank 40, a nuclear reactor 50 and a cooling water recirculation pump 60. The pressure equalizing pipe 30 includes a pressure equalizing control valve 31. The cooling water supply tank 40 includes an internal circulation prevention structure 41 provided with a cooling water guide 42.

The compressor 20 is connected to the cooling water supply tank 40 by the pressure equalizing pipe 30. The compressor 20 can contain high-temperature vapor therein.

The pressure equalizing pipe 30 is disposed between the compressor 20 and the cooling water supply tank 40. The pressure equalizing pipe 30 functions to maintain the pressure between the compressor 20 and the cooling water supply tank 40 in an equilibrium state. Preferably, the pressure equalizing pipe 30 is provided with a pressure equalizing control valve 31 for use in maintaining the pressure between the compressor 20 and the cooling water supply tank 40 in an equilibrium state.

The pressure equalizing control valve 31 is configured such that even during a power station black out accident, it can be operated by emergency power using a battery.

In detail, the compressor 20 is connected to an upper part of the cooling water supply tank 40 by the pressure equalizing pipe 30 such that the high-pressure compressor 20 and the low-pressure cooling water supply tank 40 are equalized in pressure.

Furthermore, the cooling water supply tank 40 can use steam compressed by the compressor 20 to supply cooling water to the nuclear reactor 50.

Figure 3A:
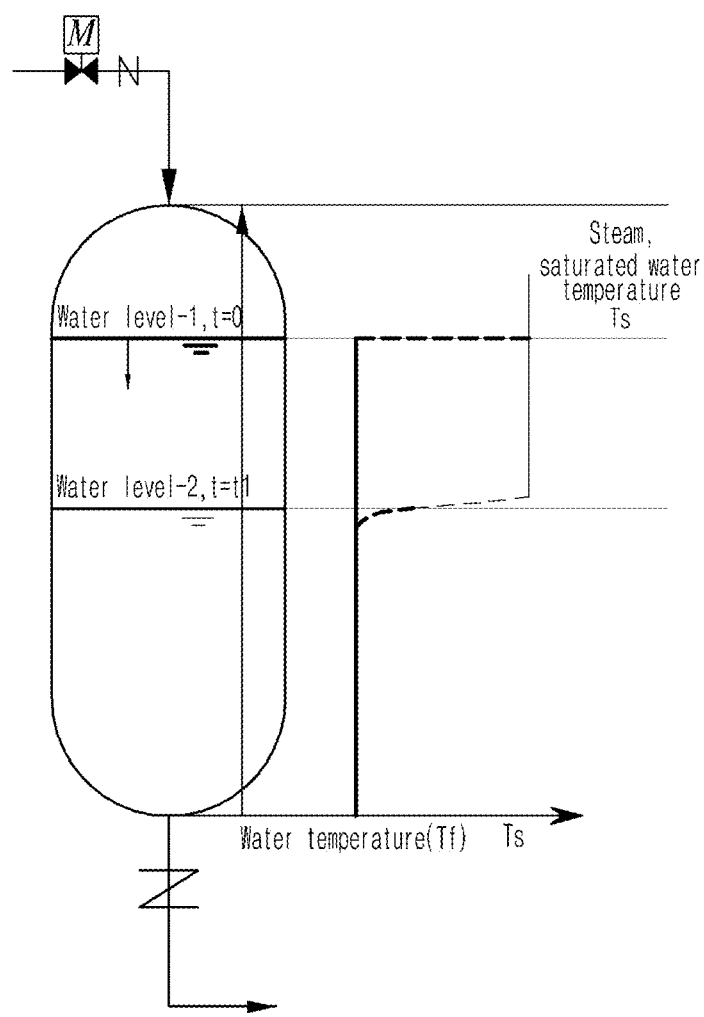

The cooling water supply tank 40 has the internal circulation prevention structure 41 therein. Provided in the cooling water supply tank 40, the internal circulation prevention structure 41 prevents cooling water from circulating in the cooling water supply tank 40. The cooling water supply tank 40 includes a core makeup tank or a hybrid safety injection tank. FIG. 3 illustrates an embodiment of the core makeup tank.

To prevent cooling water from undesirably moving in the cooling water supply tank 40, the internal circulation prevention structure 41 has therein at least one cooling water guide 42 which partitions at least a portion of the internal space of the cooling water supply tank 40 into a plurality of areas. The cross-section of the internal circulation prevention structure 41 has a shape selected from among a shape having a plurality of polygons, a circular shape and a spiral shape. Furthermore, the internal circulation prevention structure 41 is a heat mixing prevention device.

The cooling water guide 42 includes at least one vertical partition. The lesser the thickness of the cooling water guide 42 to reduce a ratio of the volume of the vertical partition to the volume of fluid, the more preferable it is. The height of the cooling water guide 42 is greater than the level of cooling water in the cooling water supply tank 40 when the cooling water supply tank 40 is in a standby state before being operated. It is preferable that the cooling water guide 42 contain non-corrosive metal.

Receiving cooling water from the cooling water supply tank 40, the nuclear reactor 50 can be maintained in a cooled state. Here, in the present invention, heat mixing and early heating is prevented by restricting internal circulation in the cooling water supply tank 40. Such heat mixing and early heating prevention of the cooling water supply tank 40 can markedly increase drive force by which cooling water is injected into the nuclear reactor 50.

The cooling water recirculation pump 60 is provided between the nuclear reactor 50 and the steam generator 10 and applies pressure to the cooling water that has cooled the nuclear reactor 50 and has been discharged therefrom, thus making the cooling water flow towards the steam generator 10.

Figure 5:
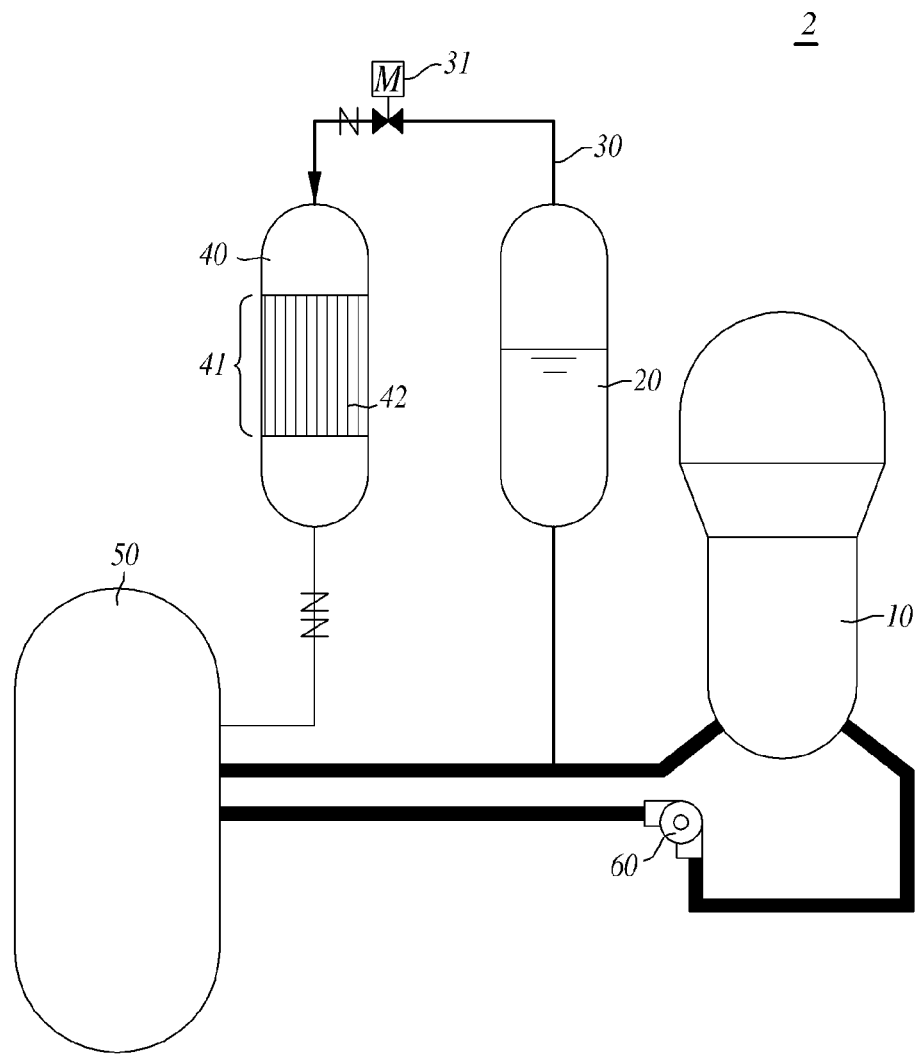
FIG. 5 is a sectional view illustrating a passive high-pressure safety injection system according to another embodiment of the present invention.

FIG. 5 is a sectional view illustrating a passive high-pressure safety injection system according to another embodiment of the present invention;

Referring to FIG. 5, the passive high-pressure safety injection system 2 according to this embodiment includes a steam generator 10, a compressor 20, a pressure equalizing pipe 30, a cooling water supply tank 40, a nuclear reactor 50 and a cooling water recirculation pump 60. The pressure equalizing pipe 30 includes a pressure equalizing control valve 31. The cooling water supply tank 40 includes an internal circulation prevention structure 41 which is provided with a cooling water guide 42. Compared to FIG. 4, although the system of FIG. 5 has the same elements as those of FIG. 4, FIG. 5 illustrates another embodiment pertaining to a hybrid safety injection tank in the cooling water supply tank 40.

Figure 6:
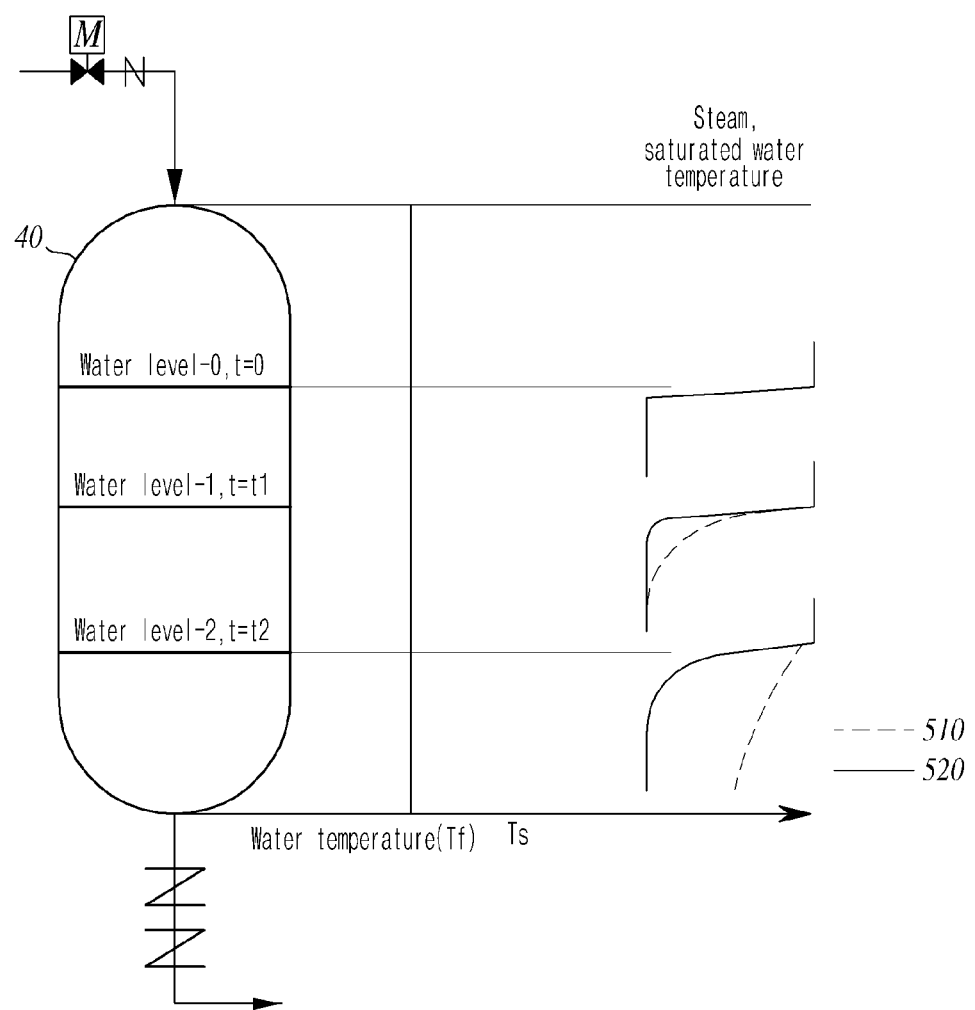
FIG. 6 is a view showing the temperature of cooling water in a cooling water supply tank of the passive high-pressure safety injection system according to an embodiment of the present invention.

FIG. 6 is a view showing the temperature of cooling water in a cooling water supply tank of the passive high-pressure safety injection system according to an embodiment of the present invention.

Referring to FIG. 6, the level of cooling water in the cooling water supply tank 40 is reduced over time. The temperature of the cooling water varies depending on the level of cooling water. Here, a first cooling water temperature 510 denotes the temperature of cooling water in the case of the conventional technique. A second cooling water temperature 520 denotes the temperature of cooling water in the case of the present invention.

In the conventional technique, cooling water of the cooling water supply tank 40 is circulated by high-temperature steam supplied into the cooling water supply tank 40. Such cooling water circulation increases the first cooling water temperature 510. Over time, as the level of cooling water is reduced, the first cooling water temperature 510 is further increased.

On the other hand, in the present invention, the internal circulation prevention structure 41 provided in the cooling water supply tank 40 mitigates circulation of cooling water that results from high-temperature steam supplied into the cooling water supply tank 40. By virtue of reduction in circulation of cooling water, the second cooling water temperature 520 does not greatly change. In other words, the cooling water in the cooling water supply tank 40 can be maintained at a low temperature, whereby the drive force by which cooling water is injected into the nuclear reactor 50 can be increased.

Figure 7:
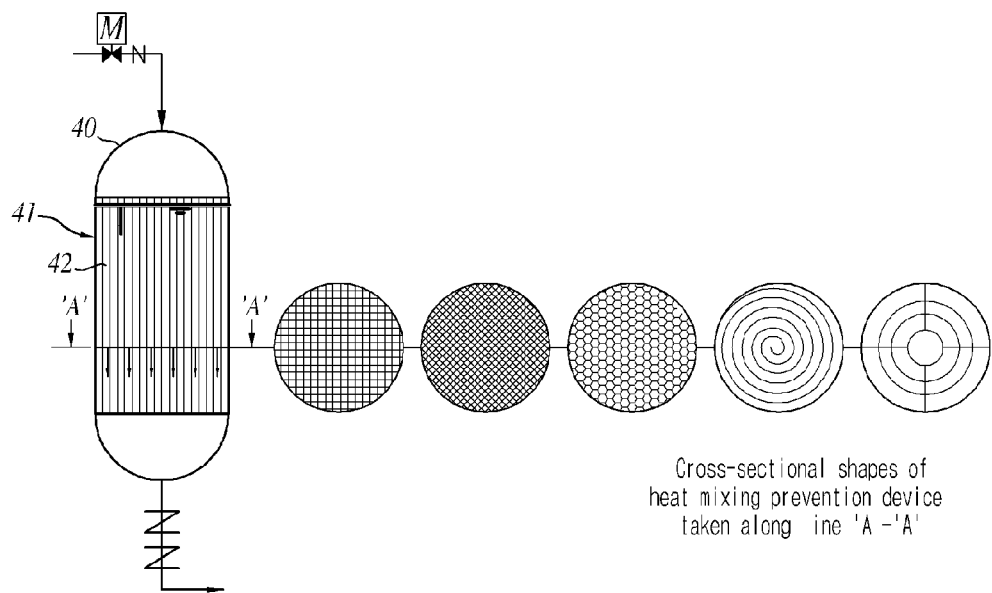
FIG. 7 is a view showing examples of a cross-sectional shape of an internal circulation prevention structure provided in the cooling water supply tank according to an embodiment of the present invention.

FIG. 7 is a view showing examples of a cross-sectional shape of the internal circulation prevention structure provided in the cooling water supply tank according to an embodiment of the present invention.

Referring to FIG. 7, the cooling water supply tank 40 has the internal circulation prevention structure 41 therein. The internal circulation prevention structure 41 functions to prevent cooling water from circulating in the cooling water supply tank 40.

The internal circulation prevention structure 41 includes at least one cooling water guide 42 which partitions at least a portion of the internal space of the cooling water supply tank 40 into a plurality of areas. Here, the cross-section of the internal circulation prevention structure 41 is formed in a shape having a plurality of polygons, a circular shape or a spiral shape by the cooling water guide 42 including at least one vertical partition.

Figure 8:
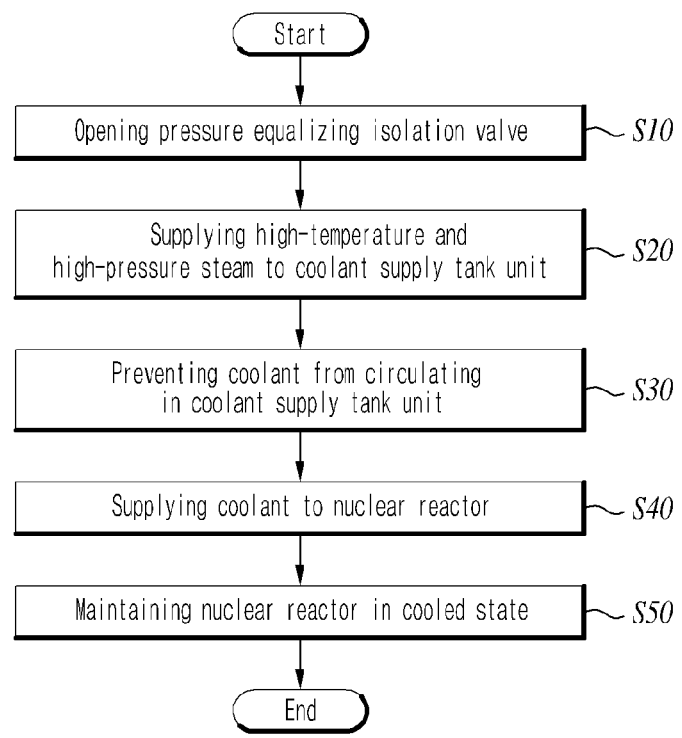
FIG. 8 is a flowchart showing a passive high-pressure safety injection method using a heat mixing prevention device according to an embodiment of the present invention.

FIG. 8 is a flowchart showing a passive high-pressure safety injection method using a heat mixing prevention device according to an embodiment of the present invention.

Figure 2:
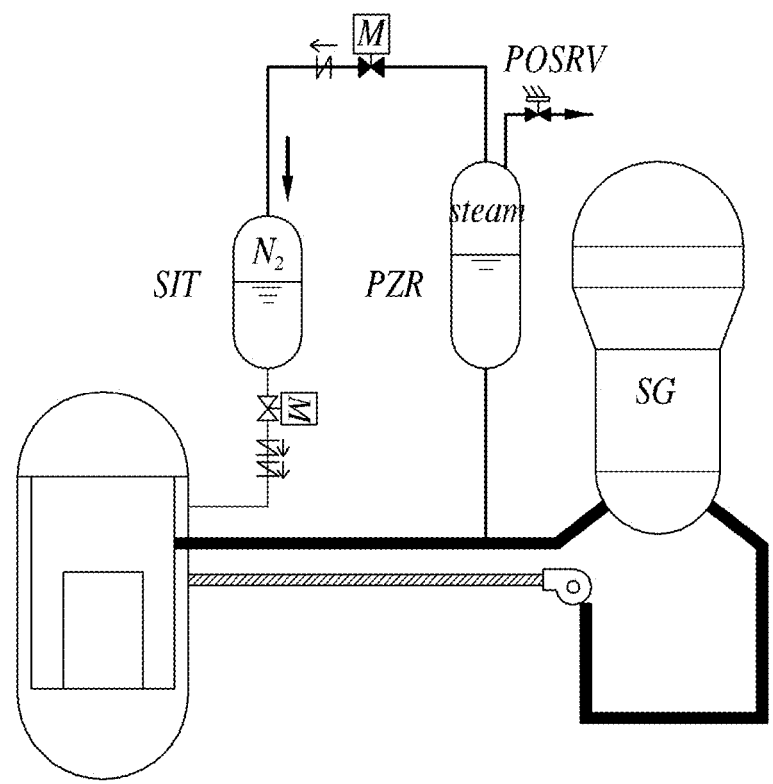
FIG. 2 is a view illustrating the construction a hybrid safety injection tank system according to a conventional technique.

Referring to FIG. 8, a pressure equalizing isolation valve shown in FIGS. 2 and 3 is opened to supply high-temperature and high-pressure steam from the compressor into the cooling water supply tank 40 (at S10).

Then, high-temperature and high-pressure steam is supplied from the compressor into the cooling water supply tank 40 (at S20).

Cooling water is prevented from circulating in the cooling water supply tank 40 attributable to steam supplied from the compressor 20 (at S30). In an embodiment, the internal circulation prevention structure 41 provided in the cooling water supply tank 40 prevents cooling water from circulating in the cooling water supply tank 40. To prevent cooling water from undesirably moving in the cooling water supply tank 40, the internal circulation prevention structure includes at least one cooling water guide 42 which partitions at least a portion of the internal space of the cooling water supply tank 40 into a plurality of areas.

The cooling water supply tank 40 supplies cooling water to the nuclear reactor 50 while circulation of the cooling water is prevented by the internal circulation prevention structure 42 (at S40).

The nuclear reactor 50 is maintained in a cooled state using cooling water supplied from the cooling water supply tank 40 (at S50).

As described above, in a cooling water supply tank having a heat mixing prevention function and a passive high-pressure safety injection system according to an embodiment of the present invention, an internal circulation prevention structure provided in a cooling water supply tank can mitigate cooling water circulation and heat mixing in the cooling water supply tank.

Thereby, a large difference in density between a high-temperature nuclear reactor and a cooling water supply tank can be maintained. In addition, the drive force by which cooling water is injected into the nuclear reactor can be markedly increased.

Moreover, by virtue of an increased cooling water injection drive force, emergency cooling safety of the nuclear reactor can be ensured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling water supply tank for a nuclear reactor system having a cooling water heat mixing prevention function, the cooling water supply tank comprising:
   a cooling water supply tank that supplies cooling water into a nuclear reactor using steam compressed by a compressor;
   an internal circulation prevention structure comprising at least one cooling water guide in the cooling water supply tank that prevents the cooling water within the cooling water supply tank from circulating in the cooling water supply tank,
   wherein the cooling water guide partitions at least a portion of an internal space of the cooling water supply tank into a plurality of areas and comprises at least one vertical partition which extends perpendicular to the bottom of the cooling water supply tank.

2. The cooling water supply tank for a nuclear reactor system as set forth in claim 1, wherein a height of an upper end of the cooling water guide is greater than a level of cooling water in the cooling water supply tank when the cooling water supply tank is in a standby state before being operated.

3. The cooling water supply tank for a nuclear reactor system as set forth in claim 1, wherein the cooling water guide is formed from non-corrosive metal.

4. The cooling water supply tank for a nuclear reactor system as set forth in claim 1, wherein a cross-section of the internal circulation prevention structure has a shape of polygons.

5. A passive high-pressure safety injection system having a cooling water heat mixing prevention function, comprising:
   a compressor that supplies steam;
   a cooling water supply tank that supplies cooling water using steam supplied from the compressor;
   a nuclear reactor that receives the cooling water so that the nuclear reactor is maintained in a cooled state; and
   an internal circulation prevention structure provided in the cooling water supply tank, the internal circulation prevention structure comprising at least one cooling water guide for preventing the cooling water within the cooling water supply tank from circulating in the cooling water supply tank,
   wherein the cooling water guide partitions at least a portion of an internal space of the cooling water supply tank into a plurality of areas and comprises at least one vertical partition which extends perpendicular to the bottom of the cooling water supply tank.

6. The passive high-pressure safety injection system as set forth in claim 5, wherein the cooling water supply tank comprises a core makeup tank.

7. The passive high-pressure safety injection system as set forth in claim 5, wherein a height of an upper end of the cooling water guide is greater than a level of cooling water in the cooling water supply tank when the cooling water supply tank is in a standby state before being operated.

8. The passive high-pressure safety injection system as set forth in claim 5, wherein the cooling water guide is formed from non-corrosive metal.

9. The passive high-pressure safety injection system as set forth in claim 5, wherein a cross-section of the internal circulation prevention structure has a shape of polygons.

10. The passive high-pressure safety injection system as set forth in claim 5, further comprising:
    a pressure equalizing pipe provided between the compressor and the cooling water supply tank, the pressure equalizing pipe maintaining a pressure between the compressor and the cooling water supply tank in an equilibrium state.

11. The passive high-pressure safety injection system as set forth in claim 10, wherein the pressure equalizing pipe comprises:
    a pressure equalizing control valve provided to maintain the pressure between the compressor and the cooling water supply tank in the equilibrium state.

12. The passive high-pressure safety injection system as set forth in claim 11, wherein the pressure equalizing control valve is operated by emergency power using a battery even during a power station black out accident.

* * * * *